April 14, 1936. P. D'ANDREA 2,037,215
AUTOMOBILE BUMPER
Filed July 31, 1933
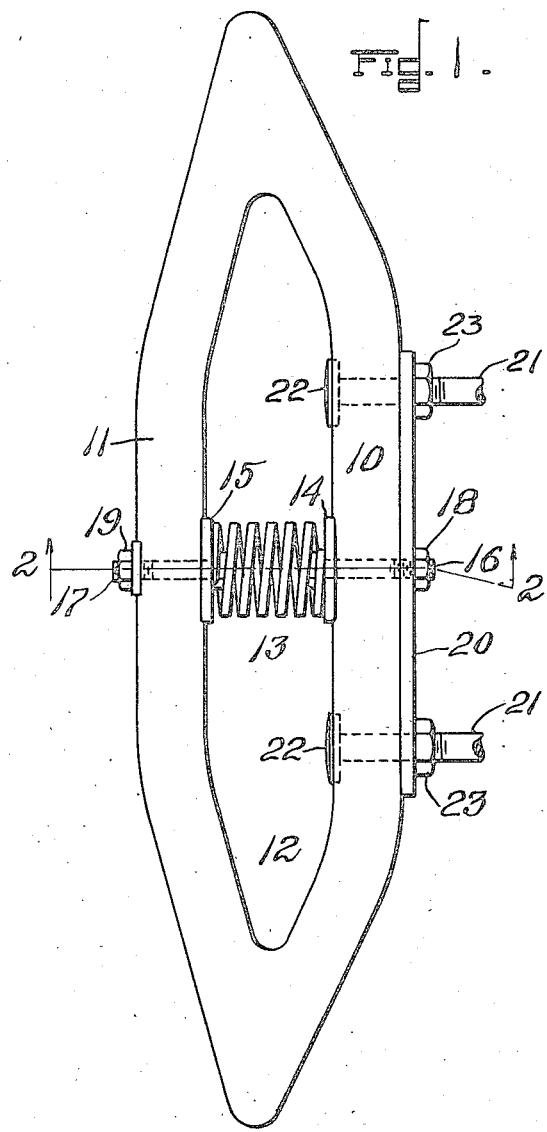
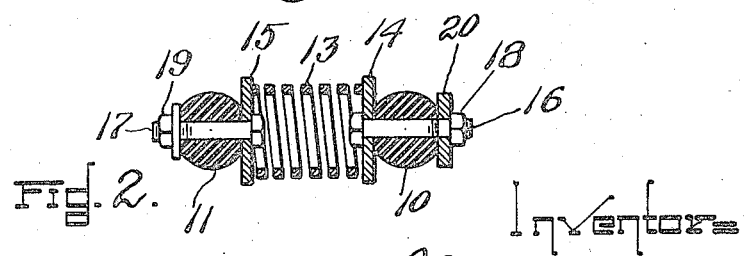
Inventor
Philip D'Andrea,
By Arthur F. Randall Patented Apr. 14, 1936

2,037,215

UNITED STATES PATENT OFFICE 2,037,215

AUTOMOBILE BUMPER

Philip D'Andrea, Boston, Mass.

Application July 31, 1933, Serial No. 682,962

2 Claims. (Cl. 293—55)

My invention relates to bumpers for motor vehicles and it has for its object to provide an improved device of this kind.

To this end I have provided an automobile bumper constructed and operating as set forth in the following description, the several novel features of the invention being separately pointed out and defined in the claims at the close thereof.

In the accompanying drawing:

Figure 1 is a top plan view of a bumper constructed in accordance with my invention.

Figure 2 is a section on line 2—2 of Fig. 1.

The embodiment of my invention herein illustrated comprises two horizontal bars of resilient rubber 10 and 11 disposed side by side in spaced apart relationship except that at each side of the bumper the proximate ends of said bars are united. This provides a rubber cushion of a width to extend across the front of an automobile, said cushion being formed with an elongate aperture 12 at its middle for the reception of a helical metal spring 13 whose opposite ends are seated against and fastened to metallic disk abutments 14 and 15, respectively.

The disk 14 is formed at its middle with an aperture for the reception of a bolt 16 by means of which it is fixed in position against the front inner side of the bar 10 of the rubber cushion while the disk 15 is likewise formed at its middle with an aperture for the reception of a bolt 17 by means of which it is fixed in position against the rear inner side of the front bar 11 of said cushion. The abutments 14 and 15 are clamped snugly against bars 10 and 11 by means of nuts 18 and 19 provided on the bolts 16 and 17, respectively.

Upon the outer side of the middle portion of the rear bar 10 of the rubber cushion is arranged a metallic reinforcing plate or bar 20 formed at its middle with an aperture through which the bolt 16 extends, the nut 18 of the latter seating against the outside of said bar 20 so as to assist in holding the same in position against bar 10.

Near each end thereof the reinforcing bar 20 is formed with an aperture for the reception of a bolt 21 which extends through said aperture and also through an aperture formed in the rubber bar 10 to the inner side of the latter where it is made with a head 22 bearing against the inner side of said rear bar 10 of the cushion. Each bolt 21 is provided with a nut 23 by means of which the bars 10 and 20 are clamped together.

The rear bars 10 and 20 of the bumper may be fixed in position on the automobile at the front thereof by any suitable means and if desired the bolts 21 may be utilized for this purpose.

From the above description it will be observed that my improved bumper is a resilient structure which will yieldingly absorb shocks occasioned by blows delivered thereon from any direction; that the metallic helical spring 13 yieldingly reinforces the front rubber bar 11 and is capable of yielding both endwise and laterally, and that the general construction is simple and comparatively inexpensive.

What I claim is:

1. A bumper for automobiles comprising a rubber cushion of a size to extend across one end of the vehicle, said rubber cushion including two horizontal bars arranged side by side and one in front of the other with their ends united and their intermediate portions occupying spaced apart relationship, and a spring fixed in position between said intermediate portions so as to yieldingly oppose movement thereof toward each other.

2. A bumper for automobiles comprising a rubber cushion of a size to extend across one end of the vehicle, said rubber cushion including two horizontal bars arranged side by side and one in front of the other with their ends united and their intermediate portions occupying spaced apart relationship; a coiled metallic spring fixed in position between said intermediate portions so as to yieldingly oppose movement thereof toward each other, and a reinforcing metallic plate fixed in position upon the outer side of one of said bars and attachable to the vehicle.

PHILIP D'ANDREA.